(12) United States Patent
Pedlar et al.

(10) Patent No.: US 7,190,955 B2
(45) Date of Patent: Mar. 13, 2007

(54) APPARATUS AND METHODS OF HANDLING SIMULTANEOUS UNIVERSAL TERRESTRIAL RADIO ACCESS NETWORK RADIO RESOURCE CONTROL PROCEDURES WITH ACTIVATION TIMES IN UNIVERSAL MOBILE TELECOMMUNICATIONS SYSTEM USER EQUIPMENT

(75) Inventors: David W. Pedlar, Solihull (GB); Nicola M. Funnell, Warwickshire (GB); Robert J. Harrison, Birmingham (GB)

(73) Assignee: M-Stack Limited, Birmingham (GB)

( * ) Notice: Subject to any disclaimer, the term of this patent is extended or adjusted under 35 U.S.C. 154(b) by 784 days.

(21) Appl. No.: 10/431,264

(22) Filed: May 7, 2003

(65) Prior Publication Data

US 2004/0224683 A1 Nov. 11, 2004

(51) Int. Cl.
*H04Q 7/20* (2006.01)
*H04M 3/16* (2006.01)
(52) U.S. Cl. ................. 455/434; 455/410; 455/411
(58) Field of Classification Search ........... 455/410, 455/411, 434
See application file for complete search history.

(56) References Cited

U.S. PATENT DOCUMENTS

| 5,999,825 A | 12/1999 | Geulen ................. 455/560 |
| 2003/0100291 A1* | 5/2003 | Krishnarajah et al. ...... 455/410 |
| 2004/0008646 A1* | 1/2004 | Park et al. .................. 370/331 |

FOREIGN PATENT DOCUMENTS

WO    WO 01 54381 A2    7/2001

OTHER PUBLICATIONS

Universal Mobile Telecommunications System (UMTS); Radio Resource Control (RRC) protocol specification (3GOO TS 25.331 version 3.10.0 Release 1999), ETSI TS 125 331 V3.10.0 (Mar. 2002), pp. 87-98, pp. 217-222.*
European Search Report of European Patent Application No. EP 03252932.3-1249 dated May 12, 2003.
Lee Y et al; "Commit-Order Oriented Validation Scheme for Transaction Scheduling in Mobile Distributed Database Systems: COOV"; IEICE Transactions on Information and Systems, Institute of Electronics Information and Comm. Eng. Tokyo, JP, vol. E80-D, No. 1, 1997, pp. 10-14, XP000701922; ISSN: 0916-8532 (the whole document).

* cited by examiner

*Primary Examiner*—Barry Taylor

(57) ABSTRACT

The details of an apparatus and methods of handling simultaneous universal terrestrial radio access network radio resource control procedures with activation times in a universal mobile telecommunications system user equipment are disclosed herein. According to one aspect, the apparatus includes a message handler to receive a received message from the UTRAN, a sequential processor to receive an ongoing command, a command store connected to the message handler to save the received command. The message handler determines if there is an existing command at the user equipment such that the user equipment appears to the UTRAN as though it were processing the select commands simultaneously while actually processing the existing command sequentially. According to another aspect, the method includes the steps of: determining if there is an existing command at the user equipment; and if there is an existing command at the user equipment, processing the existing command prior to processing any received commands such that the user equipment appears to be processing commands simultaneously. According to a third aspect, the method includes the steps of: determining the current time (T); and determining that the first activation time (T1) comes after the second activation time (T2) if (T<T1) XOR (T<T2) XOR (T2<T1).

17 Claims, 7 Drawing Sheets

APPARATUS AND METHODS OF HANDLING SIMULTANEOUS UNIVERSAL TERRESTRIAL RADIO ACCESS NETWORK RADIO RESOURCE CONTROL PROCEDURES WITH ACTIVATION TIMES IN UNIVERSAL MOBILE TELECOMMUNICATIONS SYSTEM USER EQUIPMENT

CROSSREFERENCE TO RELATED APPLICATION

N/A

BACKGROUND

1. Technical Field

This application relates to UMTS (Universal Mobile Telecommunications System) in general, and to an apparatus and methods of handling simultaneous universal terrestrial radio access network radio resource control procedures with activation times in a universal mobile telecommunications system user equipment in particular.

2. Description of the Related Art

UMTS is a third generation public land mobile telecommunication system. Various standardization bodies are known to publish and set standards for UMTS, each in their respective areas of competence. For instance, the 3GPP (Third Generation Partnership Project) has been known to publish and set standards for GSM (Global System for Mobile Communications) based UMTS, whereas the 3GPP2 (Third Generation Partnership Project 2) has been known to publish and set standards for CDMA (Code Division Multiple Access) based UMTS. Within the scope of a particular standardization body, specific partners publish and set standards in their respective areas.

Standard document ETSI TS 125 331 v3.10.0 (2002–03) addresses the subject of UMTS RRC (Radio Resource Control) protocol requirements between UTRAN (Universal Terrestrial Access Network) and UE (User Equipment). Although ETSI TS 125 331 specifies the requirement that the UE shall be able to process several RRC procedures, the document may not address how to meet the requirements for handling simultaneous RRC procedures in particular.

Consider a wireless mobile device, also known as user equipment (UE), which complies with the ETSI specifications for the UMTS protocol. The ETSI specification for the RRC layer of the UE, ETSI TS 125 331 v3.10.0 (2002–03), states in section 8 as quoted:

"The UE shall be able to process several simultaneous RRC procedures. After the reception of a message which invoked a procedure, the UE shall be prepared to receive and act on another message which may invoke a second procedure."

Most RRC procedures are initiated upon receiving a command from the UTRAN and most procedures end after the UE has sent a response message back to the UTRAN. Often the procedure extends to include receiving an acknowledgement of the response message from the UTRAN, but not always. This behaviour is detailed in TS 125.331 for each individual procedure. Although it may not be possible to genuinely handle UTRAN commands simultaneously without the use of multiple processors, there is a need for a solution that can be practiced using a single processor.

SUMMARY

The details of an apparatus and methods of handling simultaneous universal terrestrial radio access network radio resource control procedures with activation times in a universal mobile telecommunications system user equipment disclosed herein may enable UE (User Equipment) to handle simultaneous UTRAN procedures generally, and to handle simultaneous UTRAN procedures with activation times in particular.

In order to comply with the requirements of the 3GPP RRC specification the UE provided in accordance with the apparatus and method of the present application advantageously appears to the UTRAN as if the UE is processing all procedures simultaneously even though the UE is mostly handling procedures sequentially.

It is an object of the present application that an apparatus and methods of handling simultaneous universal terrestrial radio access network radio resource control procedures with activation times in a universal mobile telecommunications system user equipment is provided at a UE having a simultaneous message handling core stack for the core network, such as the NAS (Non-Access Stratum), and one or more access network stacks of the access networks, such as the AS (Access-Stratum), thereby ensuring that the UE appears to the UTRAN as if the UE is processing all procedures simultaneously while the UE is enabled to handle procedures sequentially.

According to one aspect of the present application, there is provided a user equipment apparatus adapted to receive messages from a UTRAN, select messages having a select command, each command having an activation time for invoking an RRC procedure at the user equipment, the apparatus comprising: a message handler to receive a received message from the UTRAN, the received message having a received command, said message handler capable of extracting the received command from the received message thereby providing a received activation time and a received RRC procedure reference; a sequential processor to receive an ongoing command having an ongoing activation time for invoking an ongoing RRC procedure, said sequential processor capable of invoking the ongoing RRC procedure at the ongoing activation time; a command store connected to the message handler to save the received command, said command store capable of storing the received command thereby providing a saved activation time and a saved RRC procedure reference; wherein said message handler is coupled to said command store and is coupled to said sequential processor to save and process commands respectively, and to determine if there is an existing command at the user equipment, the existing command being one of the saved command and the ongoing command, such that the user equipment appears to the UTRAN as though it were processing the select commands simultaneously while actually processing the existing command sequentially.

According to another aspect of the present application, there is provided a method of processing simultaneous commands at a user equipment, the simultaneous commands sent from a UTRAN to the user equipment, the method comprising the steps of: (a) determining if there is an existing command at the user equipment; and (b) if there is an existing command at the user equipment, processing the existing command prior to processing any received commands such that the user equipment appears to be processing commands simultaneously.

According to yet another aspect of the present application, there is provided a method of comparing a first activation time to a second activation time at a user equipment, the method comprising the steps of: (a) determining the current time (T); and (b) determining that the first activation time (T1) comes after the second activation time (T2) if (T<T1) XOR (T<T2) XOR (T2<T1).

Other aspects and features of the present application will become apparent to those ordinarily skilled in the art upon review of the following description of specific embodiments of an apparatus and methods of handling simultaneous universal terrestrial radio access network radio resource control procedures with activation times in a universal mobile telecommunications system user equipment in conjunction with the accompanying figures.

BRIEF DESCRIPTION OF THE DRAWINGS

Embodiments of the present application will now be described, by way of example only, with reference to the attached figures, wherein.

Same reference numerals are used in different figures to denote similar elements.

DETAILED DESCRIPTION OF THE DRAWINGS

Figure 1:
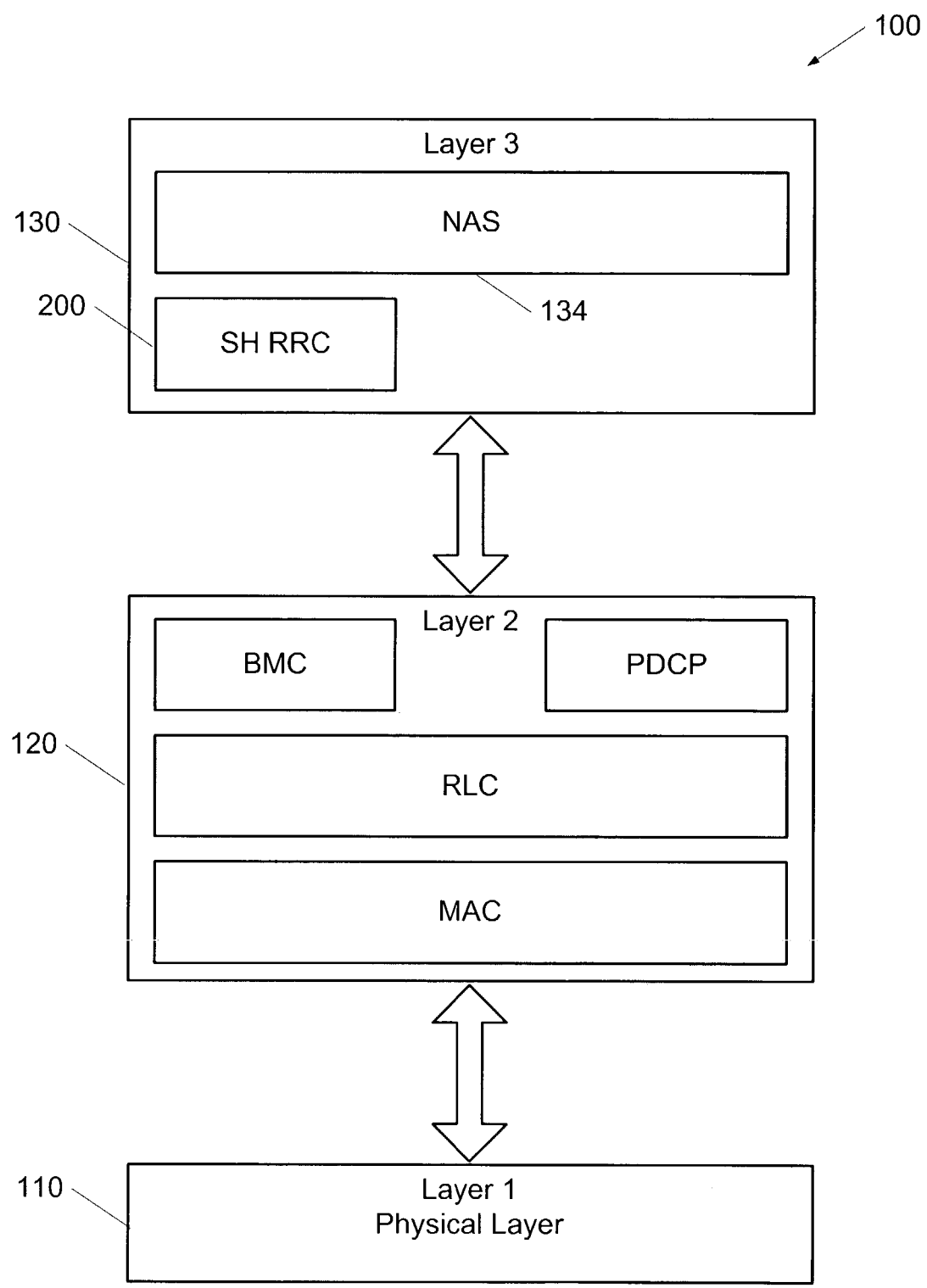
FIG. 1 is a block diagram illustrating an embodiment of a protocol stack apparatus provided with a simultaneous handling RRC block, in accordance with the present application.

Referring to the drawings, FIG. 1 is a block diagram illustrating an embodiment of a protocol stack apparatus provided with a simultaneous handling RRC block, in accordance with the present application.

The SH RRC block (Simultaneous Handling RRC) 200 is a sub layer of radio interface Layer 3 130 of a UMTS protocol stack 100. The SH RRC 200 exists in the control plane only and provides information transfer service to the non-access stratum NAS 134. The SH RRC 200 is responsible for controlling the configuration of radio interface Layer 1 110 and Layer 2 120. When the UTRAN wishes to change the UE configuration it will issue a message to the UE containing a command to invoke a specific RRC procedure. The SH RRC 200 layer of the UE decodes this message and initiates the appropriate RRC procedure. Generally when the procedure has been completed (either successfully or not) then the SH RRC sends a response message to the UTRAN (via the lower layers) informing the UTRAN of the outcome. Although it should be noted that there are a few scenarios where the SH RRC will not issue a response message to the UTRAN, in those cases the SH RRC need not and does not reply.

Advantageously, The SH RRC block 200 allows the protocol stack 100 to be seen as processing the UTRAN command procedures simultaneously while enabling the protocol stack 100 to process UTRAN command procedures sequentially.

Figure 2:
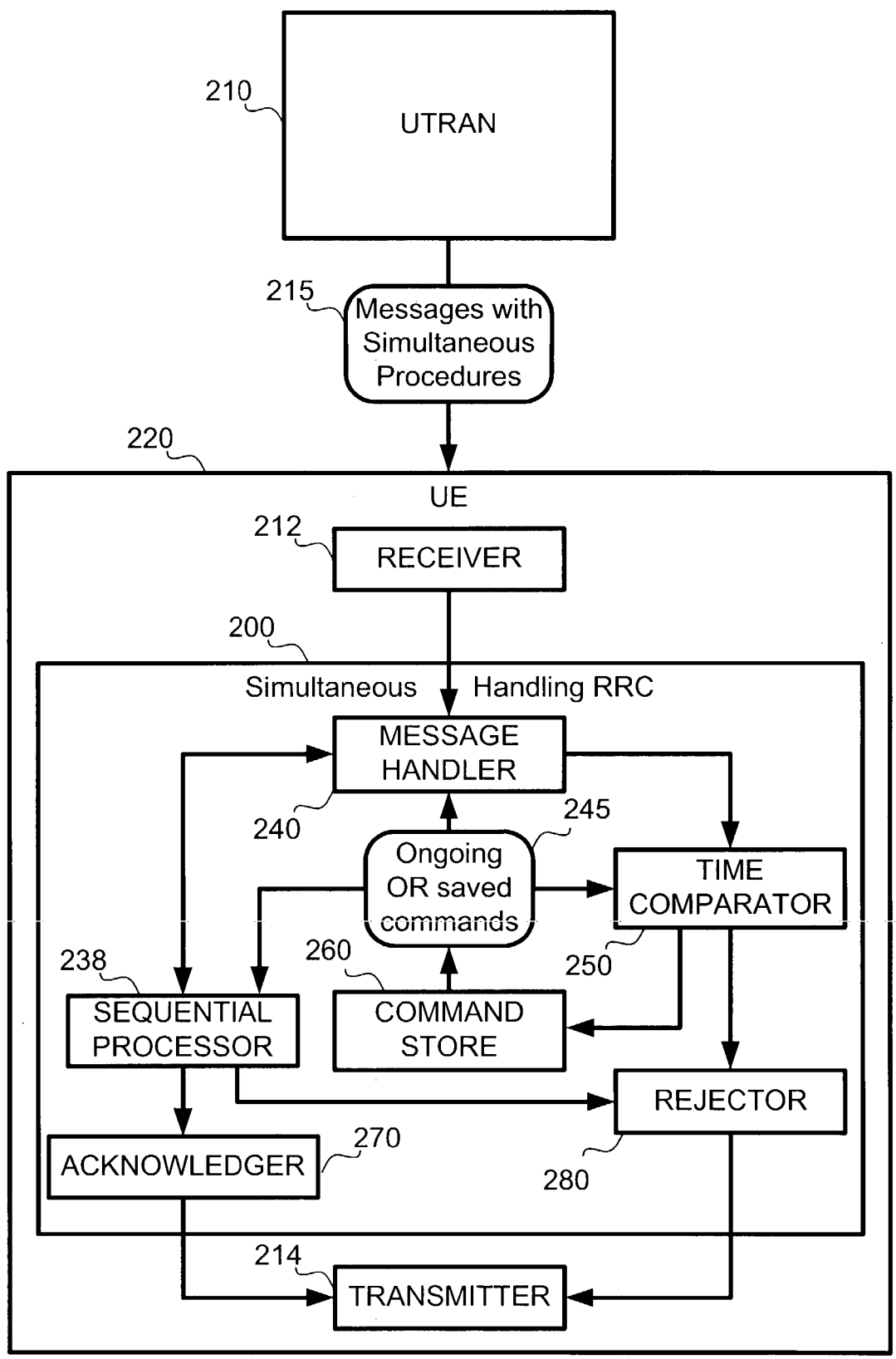
FIG. 2 is a block diagram illustrating in greater detail the simultaneous handling RRC block of FIG. 1.

Turning now to FIG. 2, FIG. 2 is a block diagram illustrating in greater detail the simultaneous handling RRC block of FIG. 1. UTRAN 210 sends messages with simultaneous procedures 215 to the UE 220. UE 220 is provided with a receiver 212, and a transmitter 214 in order to receive the messages 215, and to respond to the UTRAN for those messages where a response is applicable. UE 220 is also provided with a simultaneous handling RRC block 200, which is connected to receive messages from UTRAN 210 via receiver 212, and which is connected to send responses to UTRAN 210 via transmitter 214. The connections between receiver 212 and simultaneous handling RRC 200, and between simultaneous handling RRC and transmitter 214 may involve blocks that are not expressly shown in FIG. 2, such as for example the protocol stack blocks of FIG. 1.

The simultaneous handling RRC block 200, is provided with a message handler 240, a sequential processor 238, a time comparator 250, a command store 260, an acknowledger 270 and a rejector 280.

Depending on the current state of simultaneous message handling RRC block 200, there may or may not be ongoing or saved commands 245, also referred to hereinafter as existing commands, in the SH RRC 200. As used in this description and in the appended claims, the term command is defined to mean either a procedure that was invoked from a message, or a message that includes an invocation to a procedure. For example, there would be no existing commands at the SH RRC if the sequential processor had no ongoing procedures and the command store had no saved messages. Conversely, it can be said that there are existing commands at the SH RRC if the sequential processor is processing an ongoing procedure, and/or if the command store had a saved message. It is envisaged that sequential processor 238 processes commands, i.e. either messages or procedures. Similarly, it is envisaged that command store 260 saves procedures, i.e. either procedures or messages.

The message handler 240 is connected to the receiver 212. Message handler 240 is capable of determining if there are any ongoing or saved commands 245, i.e. existing commands that exist in simultaneous handling RRC 200. If there are no existing commands, then sequential processor 238 processes received UTRAN commands in sequence. However, if message handler 240 determines that there is an existing command, for instance because sequential processor 238 is busy processing a previously received command, then message handler 240 routes the received command to the time comparator block 250, which proceeds to compare the activation time of the existing command with the activation time of the received command. If the activation time of the received command is later than the activation time of the existing command, then the command store block 260 saves the received command so that it can be processed after the existing command has completed processing. On the other hand, if the activation time of the received command is not later than the activation time of the existing command, then the rejector 280 simply rejects the received command. Sequential processor 238 processes received and saved commands in sequence at the corresponding activation times, and depending on the outcome of the processing, either rejects a specific message via rejector 280, or acknowledges a specific message via acknowledger 270. Both acknowledger 270 and rejector 280 communicate the outcome of simultaneous message handling RRC processing to the UTRAN via transmitter 214. In the event that a command does not require a response, sequential processor 238 need not send either a response or a rejection.

In the event that more than one existing command exists at the SH RRC 200, it is envisaged that the latest activation time for the existing commands be used by the time comparator 250 when comparing the received activation time to the existing activation time.

Advantageously, the apparatus of FIG. 2 enables the UE to process UTRAN procedures sequentially while the UTRAN sees the UE processing the UTRAN procedures simultaneously.

Figure 3:
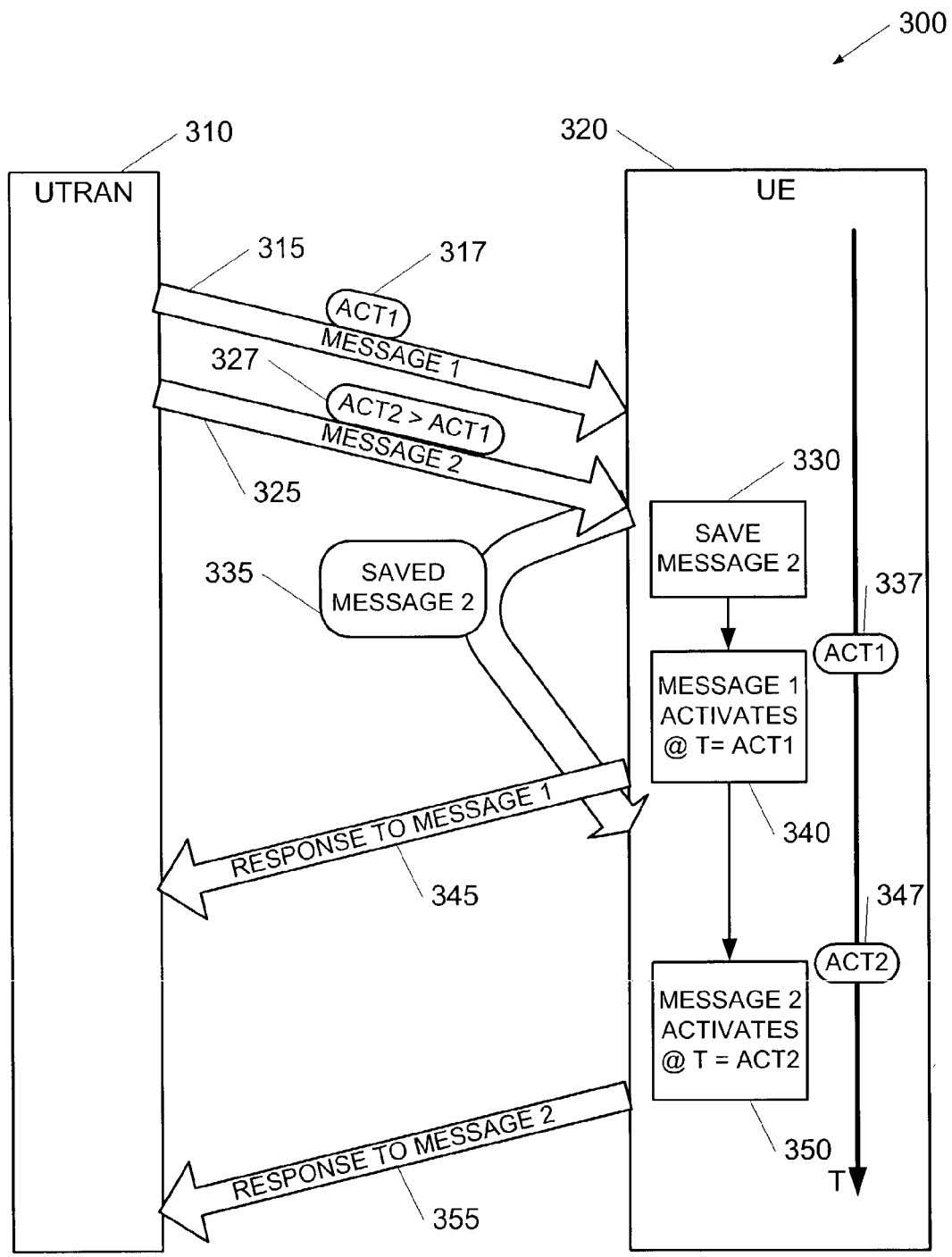
FIG. 3 is a first interaction diagram illustrating simultaneous procedure handling, in accordance with the present application.

Turning now to FIG. 3, FIG. 3 is a first interaction diagram illustrating simultaneous procedure handling, in accordance with the present application. UTRAN 310 sends a first message, 'message 1' 315 having activation time 'ACT1' 317 to UE 320, and then sends a second message, 'message 2' 325, having activation time 'ACT2>ACT 1' 327 to UE 320. The activation time of 'message 2' 325 is later than the activation time of 'message 1'. Therefore, upon reception of 'message 2' 327, UE 320 saves 'message 2' at step 330, activates 'message 1' at step 340 at time T=ACT1 337, and sends 'response to message 1' 345 back to UTRAN 310. However, since UE 320 advantageously has 'saved message 2' 335, at a time after 'ACT1' but before 'ACT2', the UE 320 proceeds to process 'saved message 2' as if it was just received from UTRAN 310. The result is that 'message 2' activates at step 350 at T=ACT2, and UE 320 sends 'response to message 2' 355 so that from the point of view of the UTRAN 310 the UE is handling simultaneous procedures. Note that either response may be an acknowledgement or a rejection if, for example, the messages cannot be processed for other reasons other than those which concern activation time. Although not expressly shown in FIG. 3, if either message did not require a response, the UE would not send one.

Figure 4:
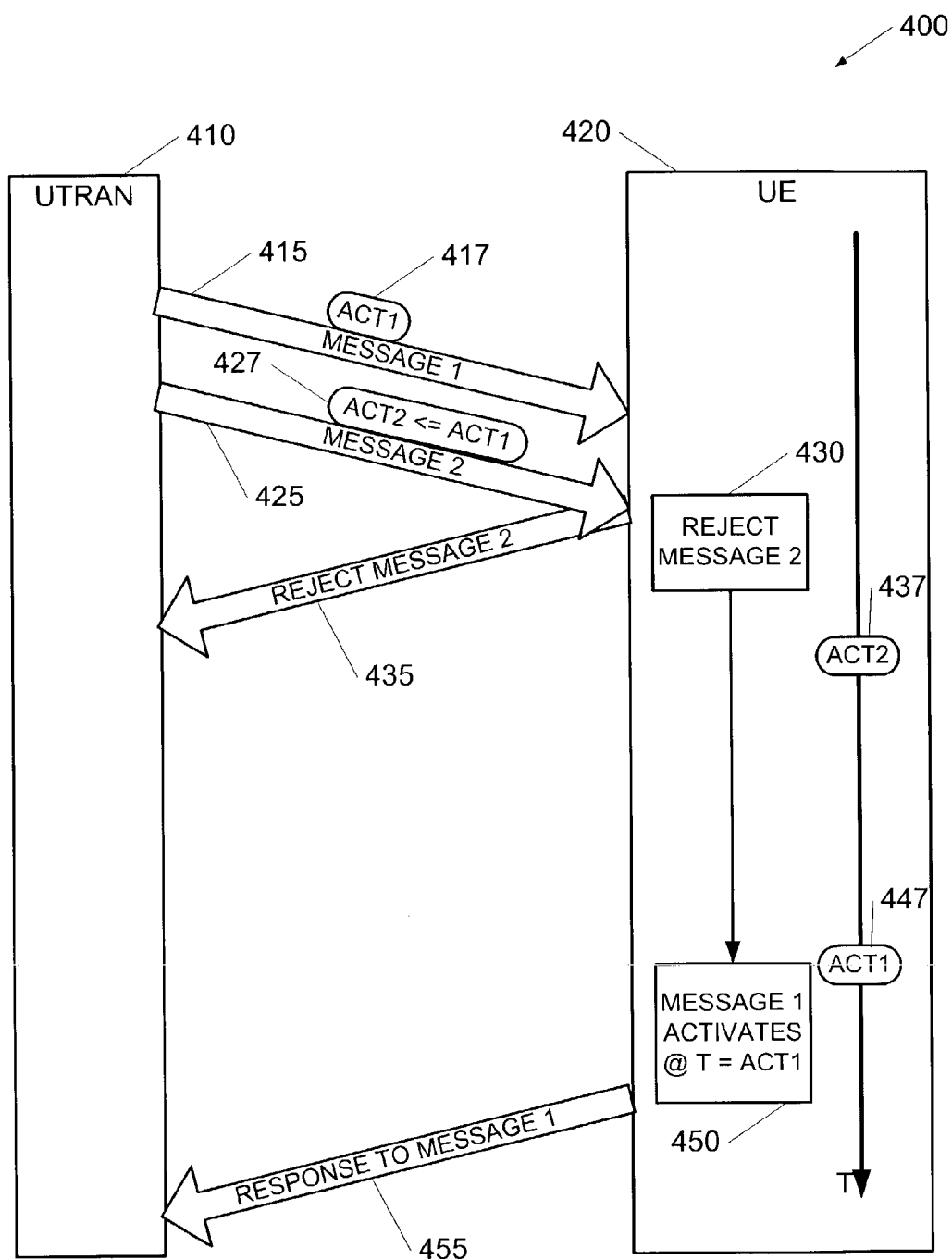
FIG. 4 is a second interaction diagram illustrating simultaneous procedure handling, in accordance with the present application.

Turning now to FIG. 4, FIG. 4 is a second interaction diagram illustrating simultaneous procedure handling, in accordance with the present application. UTRAN 410 sends a first message, 'message 1' 415 having activation time 'ACT1' 417 to UE 420, and then sends a second message, 'message 2' 425, having activation time 'ACT2<=ACT 1' 427 to UE 420. The activation time of 'message 2' 425 is earlier or equal to the activation time of 'message 1'. Therefore, upon reception of 'message 2' 427, UE 420 sends a 'reject message 2' 435 to UTRAN 410. At time T=ACT2 437, UE 420 need not activate 'message 2' as UE 420 has advantageously rejected 'message 2' 425. At T=ACT1 UE 420 activates 'message 1' at step 450, and sends 'response to message 1' 455. back to UTRAN 410. Note that the response to message 1 may be an acknowledgement or a rejection if, for example, the message cannot be processed for other reasons other than those which concern activation time.

Although the term message was used in FIGS. 3 and 4, and their description, it is envisaged that either procedures or commands be simultaneously handled in substantially the same manner as illustrated and described.

Figure 5:
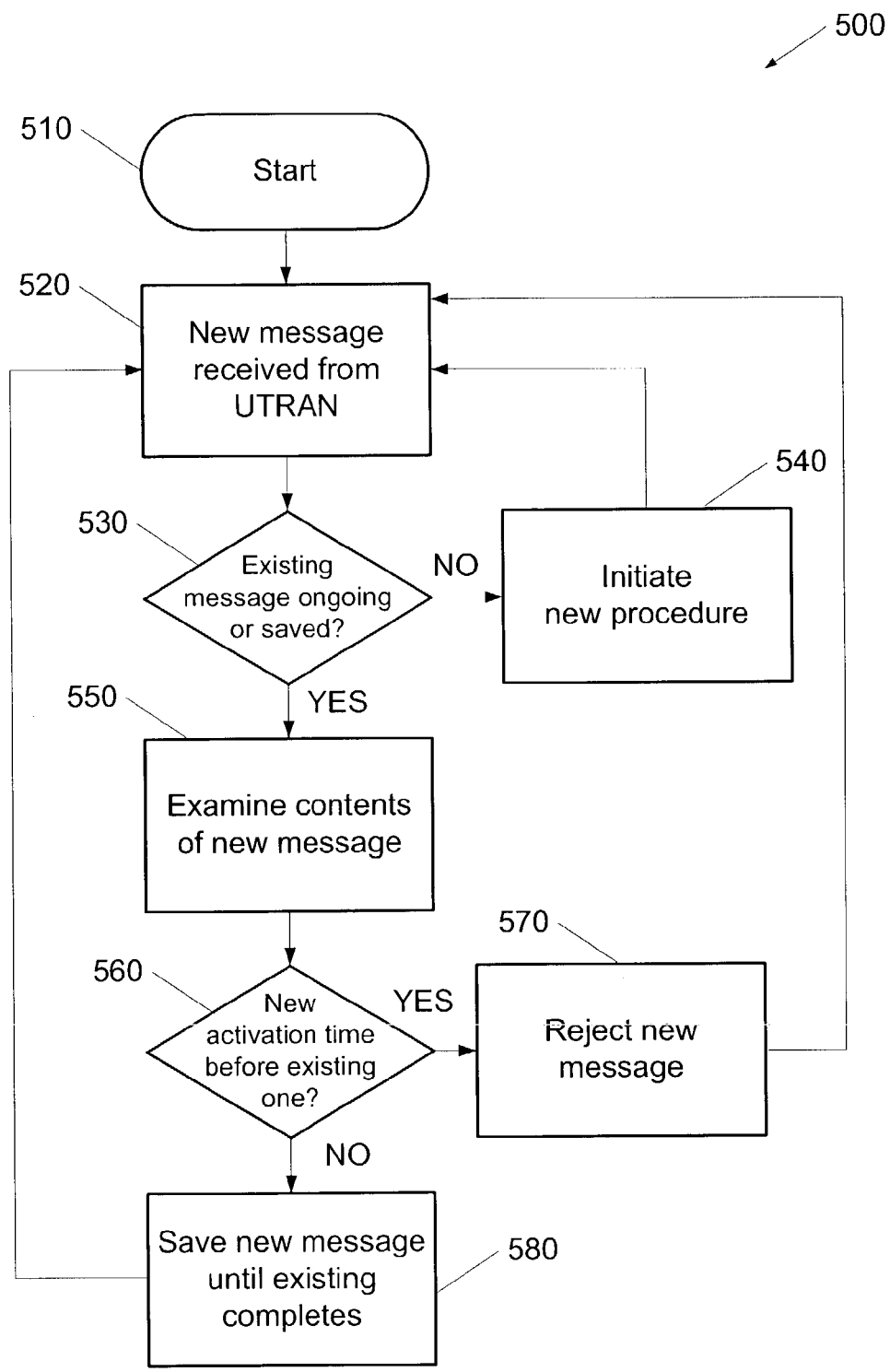
FIG. 5 is a flowchart illustrating an embodiment of a method of simultaneous procedure handling in accordance with the present application.

Turning now to FIG. 5, FIG. 5 is a flowchart illustrating an embodiment of a method of simultaneous procedure handling in accordance with the present application.

The UE can only process one or part of one procedure at a time, therefore, complex procedures must be broken down into intermediate steps. Between each step the UE is in a transitional state, waiting for an event to trigger the next step in the procedure. In each of these transitional states the UE must be capable of responding to further messages from the UTRAN that will initiate 'simultaneous' procedures. Simultaneous commands are defined as those received before the UE has completed execution of a previous command.

Having to handle a simultaneous command with an activation time prior to that of a command already received may require excessively complex software to implement. Therefore, simultaneous commands with activation times before those of previous commands are rejected.

Note that, although the RRC standard may suggest that out-of-order simultaneous commands (with respect to activation times) should be supported by the UE, it is envisaged that this will not be implemented by many UE's due to the complexity involved so that UTRAN implementations will probably send simultaneous commands in order.

Simultaneous commands with activation times after those of the previous commands may be queued until the lower layers have completed execution of the previous commands. In the case when the new activation time is later in time than the old existing one, the UE is able to successfully pretend to the UTRAN that it is handling the commands simultaneously when in fact it is not.

The flowchart of FIG. 5 summarizes an embodiment of a method provided at the UE in accordance with the present application. At step 510, the method 500 begins. At step 520, a message is received from the UTRAN at the UE. At step 530, a determination is made as to whether there is an existing procedure that exists, i.e. ongoing or saved. If there is no existing procedure, then the method continues at step 540 whereat a new procedure is initiated, and the method waits for new messages at step 520. However, if there is an existing procedure, then the method continues at step 550 whereat the method examines the contents of the message received at step 520, after which at step 560 it is determined whether the new activation time examined at step 550 is before the old activation time of the existing procedure determined at step 530. If the new activation time is before the old activation time, then the method continues at step 570 whereat the new message is rejected and the method returns to step 520 in order to wait for new messages. However, if the new activation time is not before the old activation time, then the method continues at step 580 whereat the new message is saved until the old message completes, after which the saved message becomes ongoing, and the method continues at step 520 to wait for new messages.

UMTS activation times specify the moment when the UE should reconfigure its communication channels. These are expressed in terms of a CFN number that can range from 0 to 255. The CFN number increments at every TTI. After reaching 255, the CFN number 'wraps-around' to 0, and continues incrementing from there. Because of this wrap-around, it is difficult to compare two activation times to determine which comes first. CFNs are described in 3GPP document TS 25.402 "Synchronization in UTRAN; Stage 2". The flowchart of FIG. 6 is a definitive way to compare two activation times, taking into account the wrap around requirement, which is left as an implementation specific detail by the relevant ETSI standards.

Figure 6:
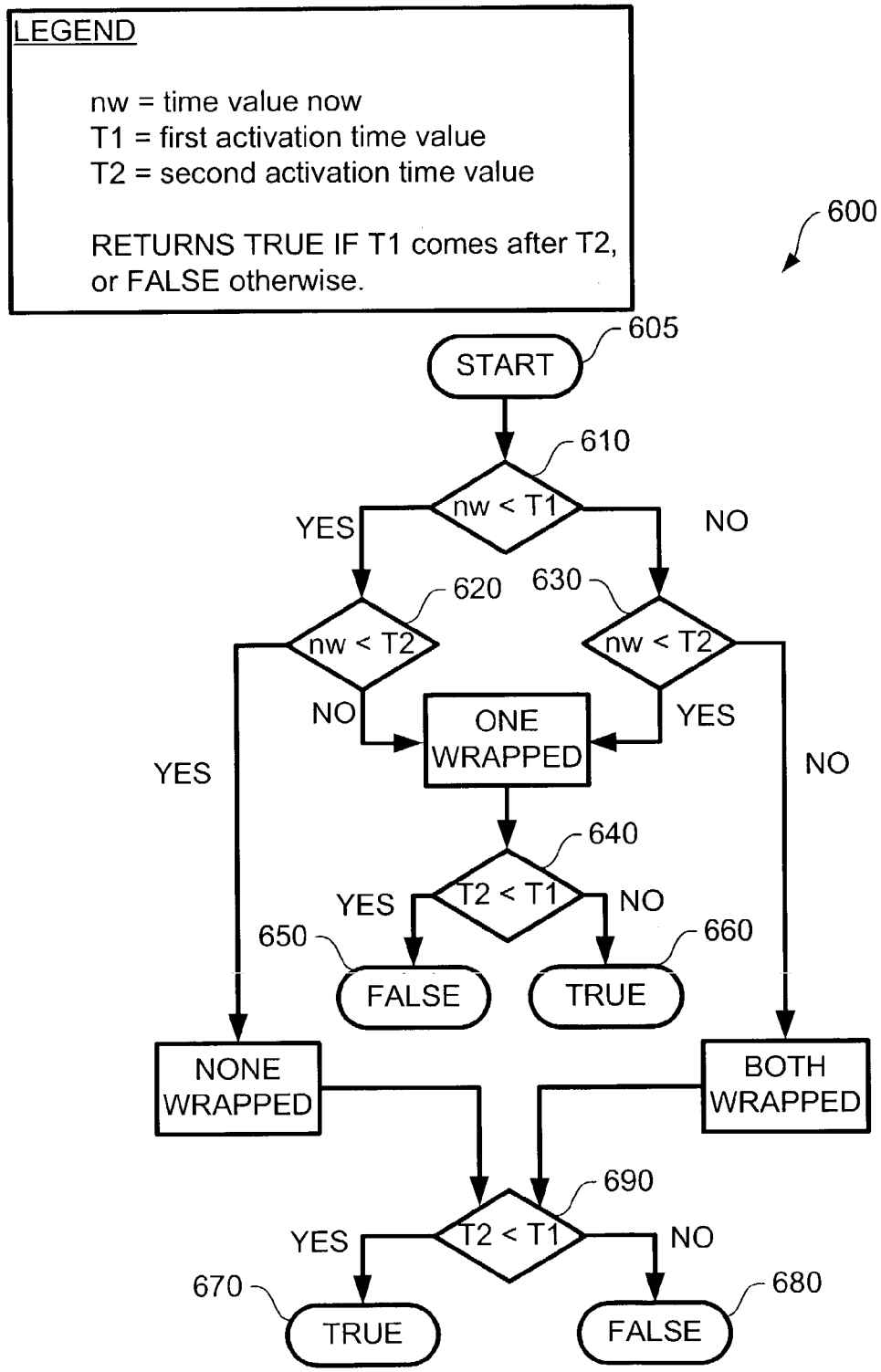
FIG. 6 is a flowchart illustrating an embodiment of an activation time value comparison method, provided in accordance with the present application.

Turning now to FIG. 6, FIG. 6 is a flowchart illustrating an embodiment of an activation time value comparison method, provided in accordance with the present application. At step 605, the method begins. At step 610, the current time value nw is compared to T1. If T1 is greater than nw, then step 620 ensues, else step 630 ensues. At steps 620 and 630, the current time value nw is compared to T2. If T2 is found to be greater than nw at step 630, or if nw is found to be smaller than T2 at step 620, then one of either T1 or T2 is wrapped and step 640 ensues whereat T2 is compared directly to T1 to determine if T1 is greater than T2, and if T1 is found to be greater in that comparison, then because of wrapping the opposite result is returned at steps 650 and 660. However, if at step 620 it was determined that T2 is greater than the current time value nw, or if at step 630 the converse was determined, then step 690 ensues because in the first case none of T1 and T2 were wrapped so a direct comparison is correct, and in the second case because both T1 and T2 were wrapped, then step 690 ensues whereat T1 can be compared directly to T2 to determine if T1 is greater than T2, and if T1 is found to be greater in that comparison, then because both T1 and T2 are in the same wrapped state, the direct result is returned at steps 670 and 680.

The UE may assume various states (these are described in 25–331 clause 7.2). One of the duties of the RRC is to keep track of the state of the UE. In some states shared or common channels are used for communication with the UTRAN. In cell_DCH state channels dedicated to the UE are used. However, entry to cell_DCH requires synchronization to be achieved. All these states, require different Radio Bearer configurations and these are contained in commands received from the UTRAN. In normal operation many UE state transitions are required.

The RRC may need to compare the Activation Times contained in Reconfiguration commands from the UTRAN in order to maintain synchronization of channel use and transition to the correct state at the moment required by the UTRAN.

Adopting the following method to determine whether T1 comes after T2 solves the problem:

T1 comes after T2 if (now<T1) XOR (now<T2) XOR (T2<T1)

This can also be implemented by other equivalent logical expressions, or by a series of nested IF statements in a suitable programming language.

Where:
'now' is the current CFN number.
T1 is one Activation Time
T2 is another Activation Time
XOR is the exclusive—OR Boolean operator
It is assumed:
(a) Both T1 and T2 are in the future
(b) Neither T1 nor T2 are more than 255 TTIs into the future This can be implemented by the flowchart illustrated in FIG. 6, which is equivalent to the more compact form described above.

Figure 7:
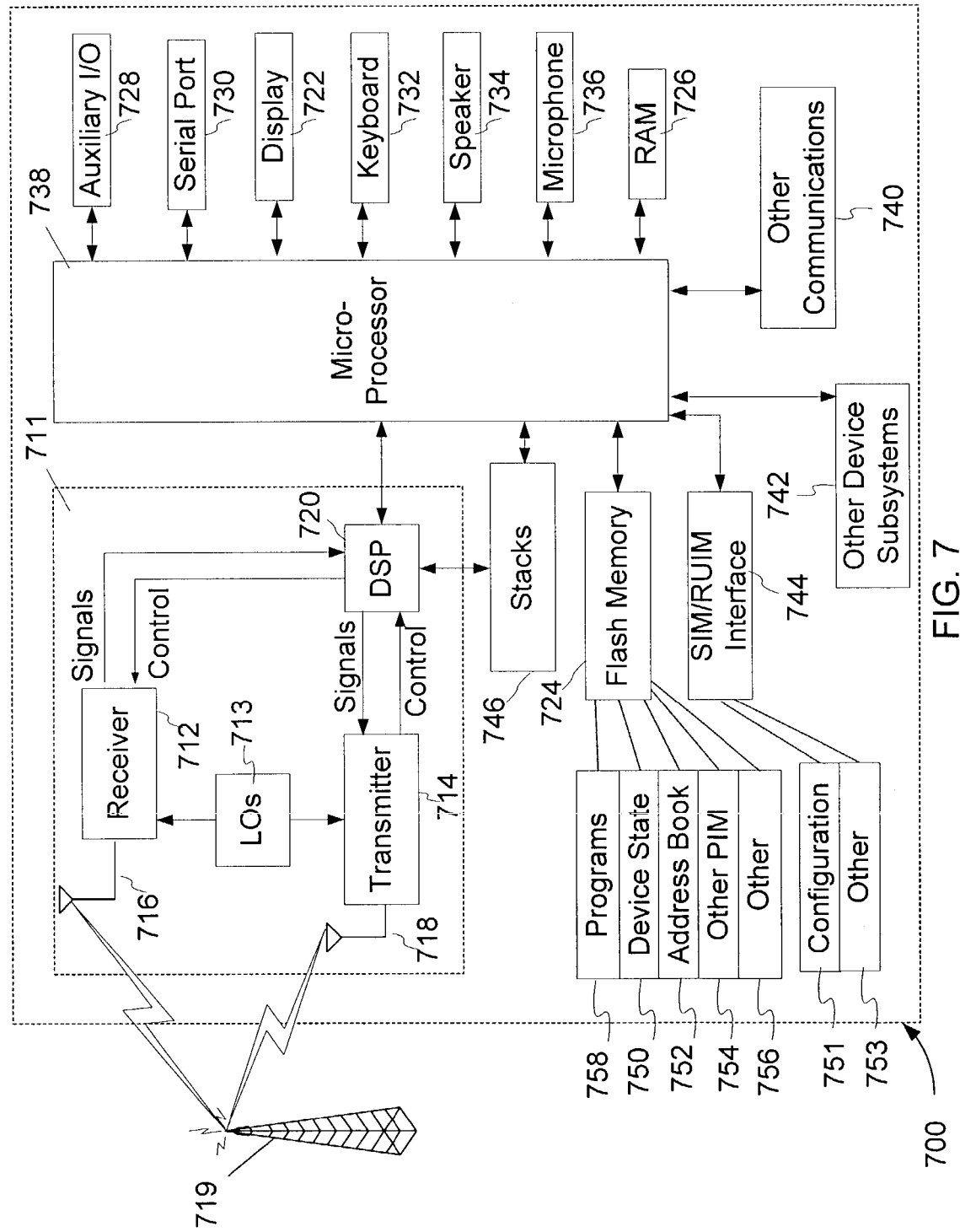
FIG. 7 is a block diagram illustrating a mobile device, which can act as a UE and co-operate with the apparatus and methods of FIGS. 1 to 6.

Turning now to FIG. 7, FIG. 7 is a block diagram illustrating a mobile device, which can act as a UE and co-operate with the apparatus and methods of FIGS. 1 to 6, and which is an exemplary wireless communication device. Mobile station 700 is preferably a two-way wireless communication device having at least voice and data communication capabilities. Mobile station 700 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 700 is enabled for two-way communication, it will incorporate a communication subsystem 711, including both a receiver 712 and a transmitter 714, as well as associated components such as one or more, preferably embedded or internal, antenna elements 716 and 718, local oscillators (LOs) 713, and a processing module such as a digital signal processor (DSP) 720. As will be apparent to those skilled in the field of communications, the particular design of the communication subsystem 711 will be dependent upon the communication network in which the device is intended to operate. For example, mobile station 700 may include a communication subsystem 711 designed to operate within the Mobitex™ mobile communication system, the DataTAC™ mobile communication system, GPRS network, UMTS network, EDGE network.

Network access requirements will also vary depending upon the type of network 719. For example, in the Mobitex and DataTAC networks, mobile station 700 is registered on the network using a unique identification number associated with each mobile station. In UMTS and GPRS networks, however, network access is associated with a subscriber or user of mobile station 700. A GPRS mobile station therefore requires a subscriber identity module (SIM) card in order to operate on a GPRS network. Without a valid SIM card, a GPRS mobile station will not be fully functional. Local or non-network communication functions, as well as legally required functions (if any) such as "911" emergency calling, may be available, but mobile station 700 will be unable to carry out any other functions involving communications over the network 700. The SIM interface 744 is normally similar to a card-slot into which a SIM card can be inserted and ejected like a diskette or PCMCIA card. The SIM card can have approximately 64K of memory and hold many key configuration 751, and other information 753 such as identification, and subscriber related information.

When required network registration or activation procedures have been completed, mobile station 700 may send and receive communication signals over the network 719. Signals received by antenna 716 through communication network 719 are input to receiver 712, which may perform such common receiver functions as signal amplification, frequency down conversion, filtering, channel selection and the like, and in the example system shown in FIG. 7, analog to digital (A/D) conversion. A/D conversion of a received signal allows more complex communication functions such as demodulation and decoding to be performed in the DSP 720. In a similar manner, signals to be transmitted are processed, including modulation and encoding for example, by DSP 720 and input to transmitter 714 for digital to analog conversion, frequency up conversion, filtering, amplification and transmission over the communication network 719 via antenna 718. DSP 720 not only processes communication signals, but also provides for receiver and transmitter control. For example, the gains applied to communication signals in receiver 712 and transmitter 714 may be adaptively controlled through automatic gain control algorithms implemented in DSP 720.

Mobile station 700 preferably includes a microprocessor 738 which controls the overall operation of the device. Communication functions, including at least data and voice communications, are performed through communication subsystem 711. Microprocessor 738 also interacts with further device subsystems such as the display 722, flash memory 724, random access memory (RAM) 726, auxiliary input/output (I/O) subsystems 728, serial port 730, keyboard 732, speaker 734, microphone 736, a short-range communications subsystem 740 and any other device subsystems generally designated as 742.

Some of the subsystems shown in FIG. 7 perform communication-related functions, whereas other subsystems may provide "resident" or on-device functions. Notably, some subsystems, such as keyboard 732 and display 722, for example, may be used for both communication-related functions, such as entering a text message for transmission over a communication network, and device-resident functions such as a calculator or task list.

Operating system software used by the microprocessor 738 is preferably stored in a persistent store such as flash memory 724, which may instead be a read-only memory (ROM) or similar storage element (not shown). Those skilled in the art will appreciate that the operating system, specific device applications, or parts thereof, may be temporarily loaded into a volatile memory such as RAM 726. Received communication signals may also be stored in RAM 726.

As shown, flash memory 724 can be segregated into different areas for both computer programs 758 and program data storage 750, 752, 754 and 756. These different storage types indicate that each program can allocate a portion of flash memory 724 for their own data storage requirements. Microprocessor 738, in addition to its operating system functions, preferably enables execution of software applications on the mobile station. A predetermined set of applications that control basic operations, including at least data and voice communication applications for example, will normally be installed on mobile station 700 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 719. In a preferred embodiment, the PIM data items are seamlessly integrated, synchronized and updated, via the wireless network 719, with the mobile station user's corresponding data items stored or associated with a host computer system. Further applications may also be loaded onto the mobile station 700 through the network 719, an auxiliary I/O subsystem 728, serial port 730, short-range communications subsystem 740 or any other suitable subsystem 742, and installed by a user in the RAM 726 or preferably a non-volatile store (not shown) for execution by the microprocessor 738. Such flexibility in application installation increases the functionality of the device and may provide enhanced on-device functions, communication-related functions, or both. For example, secure communication applications may enable electronic commerce functions and other such financial transactions to be performed using the mobile station 700.

In a data communication mode, a received signal such as a text message or web page download will be processed by the communication subsystem 711 and input to the microprocessor 738, which preferably further processes the received signal for output to the display 722, or alternatively to an auxiliary I/O device 728. A user of mobile station 700 may also compose data items such as email messages for example, using the keyboard 732, which is preferably a complete alphanumeric keyboard or telephone-type keypad, in conjunction with the display 722 and possibly an auxiliary I/O device 728. Such composed items may then be transmitted over a communication network through the communication subsystem 711.

For voice communications, overall operation of mobile station 700 is similar, except that received signals would preferably be output to a speaker 734 and signals for transmission would be generated by a microphone 736. Alternative voice or audio I/O subsystems, such as a voice message recording subsystem, may also be implemented on mobile station 700. Although voice or audio signal output is preferably accomplished primarily through the speaker 734, display 722 may also be used to provide an indication of the identity of a calling party, the duration of a voice call, or other voice call related information for example.

Serial port 730 in FIG. 7, would normally be implemented in a personal digital assistant (PDA)-type mobile station for which synchronization with a user's desktop computer (not shown) may be desirable, but is an optional device component. Such a port 730 would enable a user to set preferences through an external device or software application and would extend the capabilities of mobile station 700 by providing for information or software downloads to mobile station 700 other than through a wireless communication network. The alternate download path may for example be used to load an encryption key onto the device through a direct and thus reliable and trusted connection to thereby enable secure device communication.

Other communications subsystems 740, such as a short-range communications subsystem, is a further optional component which may provide for communication between mobile station 700 and different systems or devices, which need not necessarily be similar devices. For example, the subsystem 740 may include an infrared device and associated circuits and components or a Bluetooth™ communication module to provide for communication with similarly enabled systems and devices.

When mobile device 700 is used as a UE, protocol stacks 746 include an apparatus and methods of handling simultaneous universal terrestrial radio access network radio resource control procedures with activation times in a universal mobile telecommunications system user equipment.

Although the terms message, procedure, and command have been specifically used in the above description and the accompanying figures, it is envisaged that either messages, commands, or procedures be handled simultaneously in accordance with the apparatus and methods of the present application, so that these terms can be interchanged without changing the scope or departing from the spirit of the present application.

The above-described, embodiments of the present application are intended to be examples only. Those of skill in the art may effect alterations, modifications and variations to the particular embodiments without departing from the scope of the application.

We claim:

1. A user equipment apparatus adapted to receive messages from a UTRAN, select messages having a select command, each command having an activation time for invoking an RRC procedure at the user equipment, the apparatus comprising:

a message handler to receive a received message from the UTRAN, the received message having a received command, said message handler capable of extracting the received command from the received message thereby providing a received activation time and a received RRC procedure reference;

a sequential processor to receive an ongoing command having an ongoing activation time for invoking an ongoing RRC procedure, said sequential processor capable of invoking the ongoing RRC procedure at the ongoing activation time;

a command store connected to the message handler to save the received command, said command store capable of storing the received command thereby providing a saved activation time and a saved RRC procedure reference;

wherein said message handler is coupled to said command store and is coupled to said sequential processor to save and process commands respectively, and to determine if there is an existing command at the user equipment, the existing command being one of the saved command and the ongoing command, such that the user equipment appears to the UTRAN as though it were processing the select commands simultaneously while actually processing the existing command sequentially.

2. The apparatus as recited in claim 1, further comprising an activation time value comparator to receive a first activation time consisting of one of the received activation time, the saved activation time, and the ongoing activation time, and to receive a second activation time consisting of another of the received activation time, the saved activation time, and the ongoing activation time, said activation time comparator capable of determining if the first activation time comes after the second activation time.

3. The apparatus as recited in claim 2, wherein said message handler is coupled to said activation time value comparator so that upon the determination that there is an existing command the received activation time is compared to the existing activation time.

4. The apparatus as recited in claim 3, wherein if said message handler determines that the received activation time comes after the existing activation time, then the received command is sent to the message store to be saved.

5. The apparatus as recited in claim 3, wherein if said message handler determines that the received activation time does not come after the existing activation time, then the received command is rejected.

6. The apparatus as recited in claim 2, further comprising a microprocessor to handle user equipment processing.

7. The apparatus as recited in claim 6, wherein said activation value comparator invokes a compare instruction that is executed by said microprocessor.

8. The apparatus as recited in claim 2, wherein the time value comparator includes means for determining the current time (T), and wherein the first activation time (T1) is determined to come after the second activation time (T2) if (T<T1) XOR (T<T2) XOR (T2<T1).

9. The apparatus as recited in claim 8, wherein the current time is the current CFN number at the user equipment.

10. The apparatus as recited in claim 9, wherein both T1 and T2 are in the future.

11. The apparatus as recited in claim 10, wherein neither T1 nor T2 are more than 255 TTIs into the future.

12. The apparatus as recited in claim 1, wherein if said message handler determines that there is not an ongoing command at said sequential processor, then said message handler sends one of the saved message and the received message to the sequential processor to become the ongoing message.

13. The apparatus as recited in claim 1, further comprising a microprocessor to handle user equipment processing.

14. The apparatus as recited in claim 13, wherein said sequential processor is provided by a procedure that is executed by said microprocessor.

15. The apparatus as recited in claim 13, wherein said message handler is provided by an interrupt service routine that is executed by said microprocessor.

16. A user equipment apparatus adapted to handle simultaneous messages having activation times for initiating RRC procedures sent from a UTRAN, comprising:

a sequential processor for processing an ongoing RRC procedure initiated at an ongoing activation time corresponding to an ongoing message;

a message store for saving a saved message having a saved activation time for initiating a saved RRC procedure;

a message handler for receiving a received message having a received activation time for initiating a received RRC procedure from the UTRAN, said message handler preferably handling said received message to be processed by said sequential processor if no ongoing message exists and if no saved message exists such that the received message becomes the ongoing message an activation time value comparator to compare the activation times of one of the ongoing message, received message, and saved message to an other of the ongoing message, received message and saved message;

said message handler connected to the message store, connected to the activation time comparator, and connected to the sequential processor such that upon reception of the received message, said message handler determines if there is an existing message consisting of one of the ongoing message and the saved message, and upon determining that there is an existing message, said message handler comparing the existing activation time to the received activation time using said activation time comparator, and upon determining that the existing activation time is later than the received activation time, rejecting the received message.

17. The apparatus as recited in claim 16, wherein said message handler, while not receiving a message, upon determination that there is no ongoing message at the sequential processor and that there is a saved message at the message store, sends the saved message to the sequential processor.

* * * * *